United States Patent
Hallak et al.

(10) Patent No.: US 11,397,533 B2
(45) Date of Patent: Jul. 26, 2022

(54) TECHNIQUES FOR SCALABLE STORAGE WITHOUT COMMUNICATION ON THE SYNCHRONOUS PATH

(71) Applicant: Vast Data Ltd., Tel Aviv (IL)

(72) Inventors: Renen Hallak, Tenafly, NJ (US); Asaf Levy, Tel Aviv (IL); Avi Goren, Tel Aviv (IL); Alex Turin, Kiryat Ono (IL)

(73) Assignee: Vast Data Ltd., Tel Aviv (IL)

( * ) Notice: Subject to any disclaimer, the term of this patent is extended or adjusted under 35 U.S.C. 154(b) by 157 days.

(21) Appl. No.: 16/867,176

(22) Filed: May 5, 2020

(65) Prior Publication Data

US 2021/0349643 A1 Nov. 11, 2021

(51) Int. Cl.
*G06F 3/06* (2006.01)
*G06F 11/07* (2006.01)

(52) U.S. Cl.
CPC ............ *G06F 3/0631* (2013.01); *G06F 3/067* (2013.01); *G06F 3/0614* (2013.01); *G06F 3/0622* (2013.01); *G06F 3/0653* (2013.01); *G06F 3/0659* (2013.01); *G06F 3/0683* (2013.01); *G06F 11/0772* (2013.01)

(58) Field of Classification Search
CPC ......... G06F 3/06–0689; G06F 11/0772; G06F 3/0631; G06F 3/0614; G06F 3/0622; G06F 3/0653; G06F 3/0659; G06F 3/067; G06F 3/0683
See application file for complete search history.

(56) References Cited

U.S. PATENT DOCUMENTS

| | | |
|---|---|---|
| 5,454,099 A | 9/1995 | Myers et al. |
| 6,247,025 B1 | 6/2001 | Bacon |
| 6,314,563 B1 | 11/2001 | Agesen et al. |
| 7,779,165 B2 | 8/2010 | Moir et al. |
| 8,868,530 B1 * | 10/2014 | Thoppal ................ G06F 3/0622 707/704 |
| 9,910,967 B2 | 3/2018 | Childress et al. |
| 2005/0066064 A1 * | 3/2005 | Micheal .................. G06F 9/526 710/1 |
| 2006/0203718 A1 * | 9/2006 | Benhase ............. G06F 11/2079 370/220 |
| 2014/0089346 A1 * | 3/2014 | Li ........................ G06F 16/2308 707/781 |
| 2017/0064027 A1 * | 3/2017 | Grenader ................. G06F 9/00 |
| 2020/0012619 A1 * | 1/2020 | Gupta ................ G06F 16/9027 |

* cited by examiner

*Primary Examiner* — Nicholas J Simonetti
(74) *Attorney, Agent, or Firm* — Vast Data Ltd.

(57) ABSTRACT

A system and method for scalable storage. The method includes placing a lock on a portion of a storage node, wherein placing the lock further comprises replacing a first value stored in the storage node with a second value using an atomic operation, wherein the atomic operation replaces the first value with the second value when the first value indicates an empty lock status, wherein the second value indicates an active lock status; allocating a storage location in the storage node by updating metadata stored in the locked portion of the storage node when the lock has been placed; and releasing the lock, wherein releasing the lock further comprises replacing the second value with a third value, wherein the third value indicates the empty lock status.

15 Claims, 4 Drawing Sheets

TECHNIQUES FOR SCALABLE STORAGE WITHOUT COMMUNICATION ON THE SYNCHRONOUS PATH

TECHNICAL FIELD

The present disclosure relates generally to distributed storage, and more specifically to communications among nodes in distributed storage systems.

BACKGROUND

Storage systems are configured to serve client requests for accessing data in the storage system. Usually, these requests are requests to read data from the storage system or to write data to the storage system, although other types of requests such as requests file creation and deletion may be received.

Distributed storage systems include multiple nodes capable of storing data and/or performing storage operations with respect to storing data. In distributed storage systems, requests can arrive at multiple nodes at or around the same time. These requests may conflict with or depend on each other and, thus, techniques for coordinating these requests are required.

Existing solutions include techniques for coordinating requests. However, these existing solutions utilize communications on the synchronous path. Use of the synchronous path may contribute to latency, lead to workload imbalances that overload nodes, and may result in major delays when nodes fail.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for scalable storage. The method comprises: placing a lock on a portion of a storage node, wherein placing the lock further comprises replacing a first value stored in the storage node with a second value using an atomic operation, wherein the atomic operation replaces the first value with the second value when the first value indicates an empty lock status, wherein the second value indicates an active lock status; allocating a storage location in the storage node by updating metadata stored in the locked portion of the storage node when the lock has been placed; and releasing the lock, wherein releasing the lock further comprises replacing the second value with a third value, wherein the third value indicates the empty lock status.

Certain embodiments disclosed herein also include a non-transitory computer readable medium having stored thereon instructions for causing a processing circuitry to execute a process, the process comprising: placing a lock on a portion of a storage node, wherein placing the lock further comprises replacing a first value stored in the storage node with a second value using an atomic operation, wherein the atomic operation replaces the first value with the second value when the first value indicates an empty lock status, wherein the second value indicates an active lock status; allocating a storage location in the storage node by updating metadata stored in the locked portion of the storage node when the lock has been placed; and releasing the lock, wherein releasing the lock further comprises replacing the second value with a third value, wherein the third value indicates the empty lock status.

Certain embodiments disclosed herein also include a system for scalable storage. The system comprises: a processing circuitry; and a memory, the memory containing instructions that, when executed by the processing circuitry, configure the system to: place a lock on a portion of a storage node, wherein placing the lock further comprises replacing a first value stored in the storage node with a second value using an atomic operation, wherein the atomic operation replaces the first value with the second value when the first value indicates an empty lock status, wherein the second value indicates an active lock status; allocate a storage location in the storage node by updating metadata stored in the locked portion of the storage node when the lock has been placed; and release the lock, wherein releasing the lock further comprises replacing the second value with a third value, wherein the third value indicates the empty lock status.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
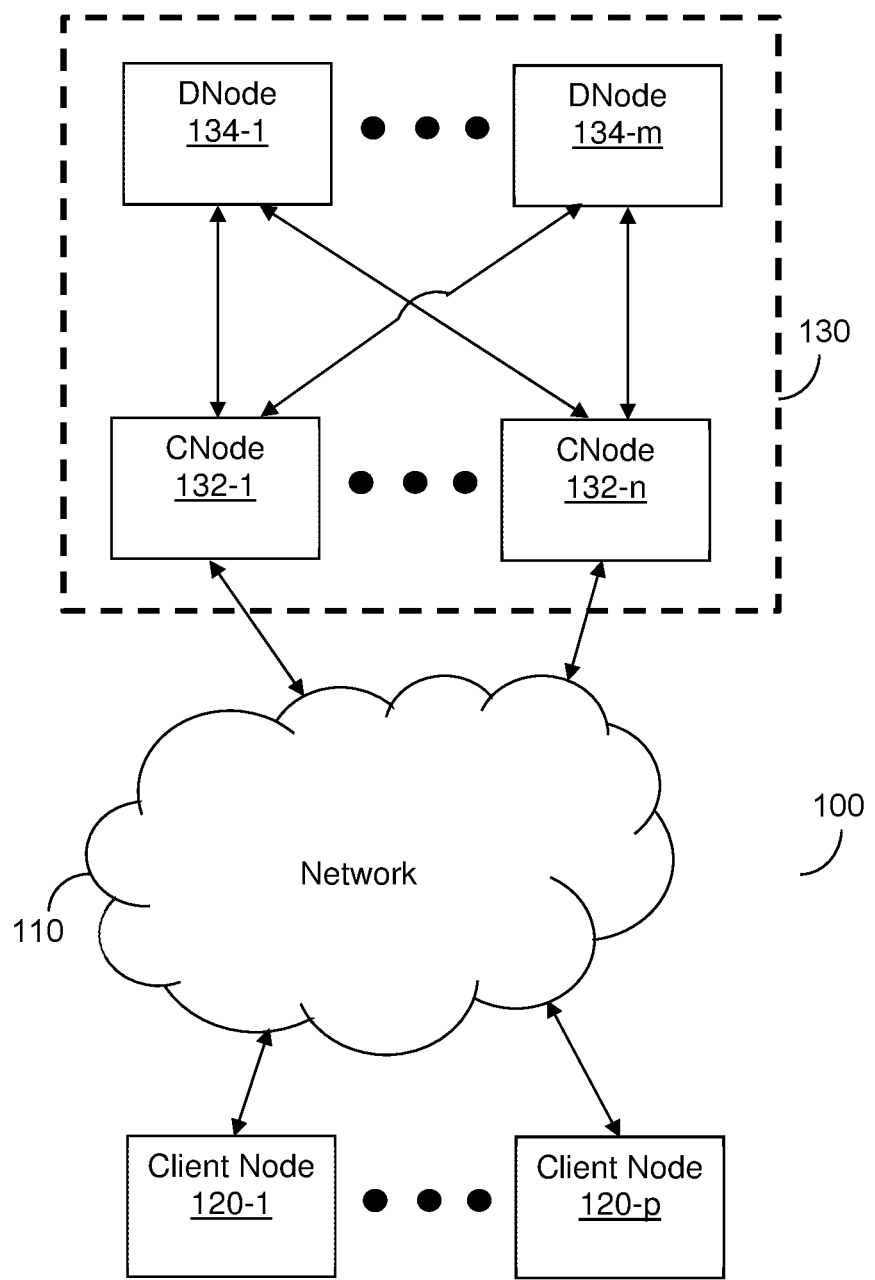
FIG. 1 is a network diagram showing a distributed storage system utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that a method requiring no communication on the synchronous path of the request execution would solve the drawbacks of existing solutions for handling requests in distributed storage systems. To this end, the disclosed embodiments provide techniques for providing scalable storage without using the synchronous path.

Existing solutions need to identify crashed nodes in order to determine when to resend requests. It has been further identified that this need complicates failure processing, thereby using additional computing resources and causing delays in operation. To this end, the disclosed embodiments provide failure handling techniques that do not require communication between CNodes in order to determine when requests to the DNodes need to be resent.

According to various disclosed embodiments, a cluster of nodes in a distributed storage system includes compute nodes (CNodes) and storage nodes (DNodes). The CNodes are configured to perform storage operations on the DNodes. The DNodes provide the storage in which data is stored. The CNodes handle logic but hold not state. Each CNode has access to all data stored in each of the DNodes in a shared everything architecture.

The disclosed embodiments do not require caching of metadata or other data. As a result, data being read from the DNodes is always consistent, and performing locks or maintaining cache coherency between CNodes is not required. To this end, the disclosed embodiments include techniques utilizing distributed storage system configurations that improve performance of operations on metadata, thereby allowing for fast metadata access without requiring caching.

Additionally, the disclosed embodiments provide techniques that allow for consistency among actions taken by the CNodes without requiring communication between the CNodes.

In an embodiment, when a write is requested, a CNode that handles the write request allocates space on a DNode by updating a metadata block. CNodes attempting to write check the metadata blocks for potential allocations such that, when the update is complete, no other CNode can write to the allocated space. This reduces issues related to data write synchronization by converting write synchronization into synchronizing metadata updates.

In an embodiment, to update a metadata block, the CNode performing the update takes a lock corresponding to the location in storage of the metadata block. To this end, the disclosed embodiments provide techniques for lock management to ensure that conflicting metadata updates are not performed at the same time.

The disclosed embodiments also include techniques for handling node and network failures. Various failure handling embodiments include maintaining identifiers used during locking for each distinct instance of a CNode such that the identifier is unique as compared to other CNodes and to the lifespan of this instance of the CNode. When a CNode fails to get a lock, it receives an identifier of the CNode that is holding the lock. If the lock holder CNode is no longer active (i.e., the locking CNode has failed), the CNode that is currently attempting a lock revokes the prior lock, thereby freeing the locked portion of storage for locking. For DNodes, failure handling may include mirroring a lock array between 2 DNodes. When a lock operation is successful on a primary copy, the lock operation is also placed on a secondary copy.

FIG. 1 is an example network diagram 100 illustrating a distributed storage system utilized according to various disclosed embodiments. The network diagram 100 includes a distributed storage compute node 132, a network 110, and client nodes 120-1 through 120-p (referred to as a client node 120 or as client nodes 120 for simplicity).

The distributed storage system 410 may be configured as described further in U.S. patent application Ser. No. 16/002, 676, assigned to the common assignee, the contents of which are incorporated by reference.

The distributed storage compute node 132 includes compute nodes 132-1 through 132-n (referred to as a CNode 132 or as CNodes 132 for simplicity) and storage nodes (DNodes) 134-1 through 134-m (referred to as a DNode 134 or as DNodes 134 for simplicity). The distributed storage compute node 132 may be configured as described further in U.S. patent application Ser. No. 16/002,676, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DNodes 134 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof.

The CNodes 132 are configured to translate access commands into formats supported by the DNodes 134. Example protocols supported via translation by the CNodes 132 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. Because the CNodes 132 are configured to translate access commands into a format that is supported by the protocol of the DNodes 134, support for new protocols may be added by configuring the CNodes 132 with translation rules for the new protocols. The translation rules may include rules for converting access commands in a received format into a format that is compatible with the protocol supported by the DNodes 134.

The CNodes 132 collectively act as a distributed transaction manager for accessing data in the DNodes 134. To this end, each CNode 132 may be configured to implement transaction manager functions by assigning and updating transaction identifiers (IDs) for locks defined with respect to data stored in the DNodes 134. Persistent memory portions of the DNodes 134 store transaction IDs indicating the state of each transaction. An example implementation of a transaction manager by the CNodes 132 is described further in U.S. patent application Ser. No. 16/122,036, assigned to the common assignee, the contents of which are hereby incorporated by reference.

As the CNodes 132 do not store the data to be accessed by client nodes or the metadata used for navigating to locations in the DNodes 134, such data and metadata do not need to be recovered when one or more of the CNodes 132 fails. Additionally, CNodes 132 may be added or removed without disrupting data stored in the storage compute node 132. An example schematic diagram of a CNode 132 is described below with respect to FIG. 4.

The client node 120 is configured to send access commands to the distributed storage compute node 132 via the network 110. The CNodes 132 are configured to receive access commands from the client nodes 120 and to access the DNodes 134 based on the received commands. The access may include translating the received commands into a format supported by the DNodes 134. As shown in FIG. 1, each CNode 132 may access all DNodes 134. As a non-limiting example, NVM Express (NVME) over Fabrics may be utilized to enable such access.

The access may include navigating an element store distributed across the DNodes 134 to access data in data blocks stored in the DNodes 134. The CNodes 132 are configured to navigate the element store to read the data blocks and to modify the element store by, for example, splitting blocks, merging blocks, and the like. To this end, the CNodes 132 may be configured to allocate new blocks, write data to blocks, read data from blocks, add and remove pointers in blocks, and the like.

Each element may further include an element data store (not shown) allowing for read and write operations of data to the element. Whether the element includes an element data store may depend on the type of the element. As a non-limiting example, a file may have an element data store. The element data store may be thinly provisioned with byte granularity such that the number of bytes written to the element data store is the number of bytes used.

At least a portion of the data blocks may be temporarily included in the elements and stored in, for example, 3D Xpoint memory of the DNodes 134 before being migrated from the 3D Xpoint memory to Flash memory of the DNodes 134. When the data is migrated to the Flash memory, the pointers of the elements which had stored the migrated data may be updated to point to the location of the migrated data in the Flash memory. The temporary storage of the data blocks allows for manipulating the data blocks (e.g., via encoding, data reduction, etc.) in the 3D Xpoint memory before migrating the data blocks to the Flash memory. Additionally, in at least some implementations, the combination of NVME over Fabric and faster storage (e.g., 3D Xpoint) allows for faster metadata access without caching.

In an embodiment, the CNodes 132, DNodes 134, or both, are configured for scalable storage without requiring use of the synchronous path as described herein. To this end, the CNodes 132 may be configured to perform any of the techniques described herein with respect to FIGS. 2 and 3.

In an embodiment, the DNodes 134 are configured to store redundant arrays of locks. In such embodiments, primary and secondary arrays of locks may be stored in respective DNodes 134. The lock array is mirrored such that the primary and secondary lock arrays are identical. Successful lock operations performed on the first array are performed on the secondary array.

In some embodiments, each DNode 134 includes a designated area for storing locks. Such an area may include, for example, a lock array. Upon startup of a DNode 134, the value of all cells in the lock array is updated to zero or a null value (i.e., a value representing an empty lock).

In an embodiment, each metadata block stored in the DNodes 134 is mapped to a corresponding portion of one of the DNodes 134 based on the location of that portion. Thus, locking a portion of data involves updating the metadata blocks mapped to the that portion of data.

It should be noted that FIG. 1 is merely an example, and that the disclosed embodiments are not limited to application in the particular distributed storage configuration shown in FIG. 1 or via the particular hardware and logical configuration of the compute nodes shown herein. In particular, in some implementations, at least some of the CNodes 132 and the DNodes 134 do not need to be physically or logically separated (i.e., any or all of the CNodes 132 may also function as DNodes 134 by providing data storage).

Figure 2:
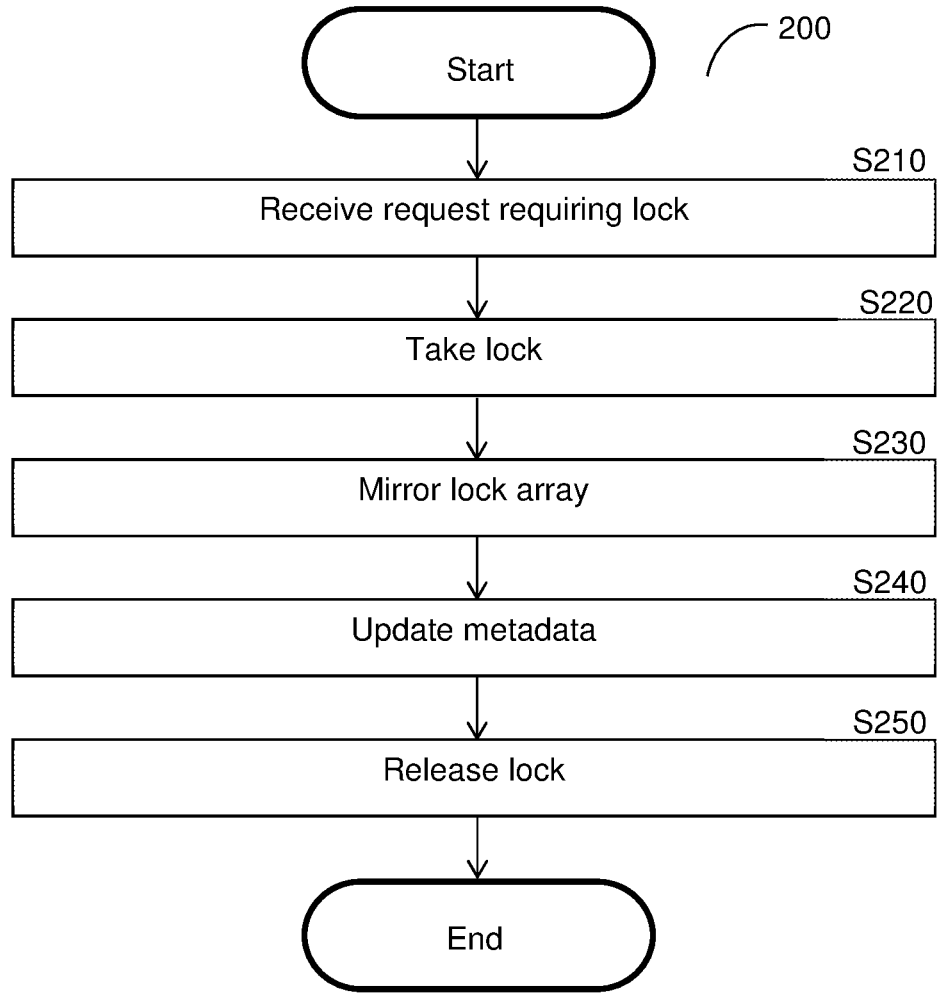
FIG. 2 is a flowchart illustrating a method for locking without communicating via the synchronous path according to an embodiment.

FIG. 2 is a flowchart 200 illustrating a method for locking without communicating via the synchronous path according to an embodiment. In an embodiment, the method is performed by one of the compute nodes (CNodes) 132, FIG. 1.

At S210, a request is received. The request is to perform one or more storage transactions requiring writing of data to a storage node (e.g., one of the DNodes 134, FIG. 1).

At S220, a lock is taken on a portion of metadata stored in the storage node. The locked metadata corresponds to the location in storage to which the data will be written.

In an embodiment, S220 includes replacing a value representing an empty lock (e.g., zero or null value) with a value representing an active lock. Such a value may be stored in a portion of the storage node used for storing locks (e.g., a lock array). In a further embodiment, when such a replacement cannot be done (e.g., when the value representing the lock is not zero or null), a lock cannot be taken on the targeted location in storage. Locking only when a value representing an empty lock can be replaced ensures that multiple CNodes cannot successfully update the same metadata at the same time.

In an example implementation, the replacement is performed using an atomic compare-and-swap operation (e.g., a remote direct memory access [RDMA] compare-and-swap operation). An atomic operation occurs without interruption by other tasks or processes. The atomicity of the compare-and-swap operation ensures that only one CNode will be able to perform the replacement such that conflicting updates cannot be performed around the same time.

In a further embodiment, the value representing the active lock is a CNode identifier associated with the CNode that placed the current lock. Thus, the value representing the active lock may be used to determine the identity of the CNode which placed the lock. In yet a further embodiment, the CNode identifiers are unique among CNodes and, further, among instances of the CNodes. To this end, in such an embodiment, when a CNode fails or is otherwise down and then subsequently is back up, the CNode is assigned a new CNode identifier that is different from the CNode identifier of the CNode prior to the failure.

In yet a further embodiment, S220 further includes receiving a notification of the result of attempting to take a lock. If no notification is received, S220 may further include attempting to perform the locking operation again. In some implementations, the subsequent attempt may utilize a different network path (i.e., in case a network path failed but the network is otherwise accessible).

When a failure notification is received during a subsequent attempt at taking the lock, the failure notification may further include a return value indicating the value representing the lock status of the metadata to be updated. To this end, S220 may further include checking, based on the return value, whether the attempted lock was successfully placed. Since such a value will include a CNode identifier when the value is not empty, S220 may further include determining whether the existing lock was placed by this CNode (i.e., the CNode currently attempting to take the lock).

If the existing lock was placed by this CNode, the CNode may treat the attempt to place a lock as successful and proceed accordingly. This checking of return values allows a CNode to confirm when a lock was successfully placed by that CNode despite not receiving a success notification. This may occur, for example, when there is a network failure that prevents communication of the success notification despite the lock having been successfully taken. As a result, additional locking operations are not required, thereby conserving computing resources. Further, communications with other CNodes are not required to check failures.

If the existing lock was placed by another CNode, S220 may further include checking the CNode identifier in the return value against a list of active CNodes. If the return value CNode identifier is not included in the list of active CNodes, S220 may include revoking the existing lock in order to allow for placement of the new lock. This provides a CNode failure handling mechanism. Revoking locks based on CNode identifiers is described further with respect to FIG. 3.

At optional S230, when the lock data stored in a first DNode (the primary DNode) has been updated to include the newly placed lock, the lock operation is also performed on lock data stored in a second DNode (the secondary DNode). Each DNode may store a respective array of locks such that the primary and secondary arrays are mirrored copies.

The primary array is accessed during normal operations while the secondary array is accessed when the primary array is inaccessible. The secondary array may therefore be used as a redundant array in the event of failure of the primary DNode. Upon failure of the primary DNode, the secondary array may be mirrored to a new location in order to restore redundancy. Note that the selection of which DNodes and corresponding arrays are primary and secondary for mirrored sets of arrays may be arbitrary and that the terms primary and secondary do not imply any kind of order or priority within the cluster outside of their respective roles in failure handling.

At S240, the locked metadata is updated in order to allocate space for the data to be written. To this end, the updated metadata indicates an allocated location. In an embodiment, S240 includes reading, modifying, and writing to the locked metadata. In a further embodiment, S240 further includes performing a data write in the allocated location in storage when the metadata has been updated. When the metadata has been updated, only the compute node that received the allocation can write to the allocated location and other compute nodes cannot write to the allocated location until the metadata is updated again. This converts write synchronization challenges into metadata updates.

At S250, the lock is released, thereby unlocking the locked metadata. In an embodiment, S250 includes performing an operation which replaces a value representing an active lock with a value representing an empty lock (e.g., zero or null value), thereby freeing the location of the metadata to be updated by other CNodes. As a non-limiting example, such a replacement operation may be a remote direct memory access (RDMA) compare-and-swap operation.

Figure 3:
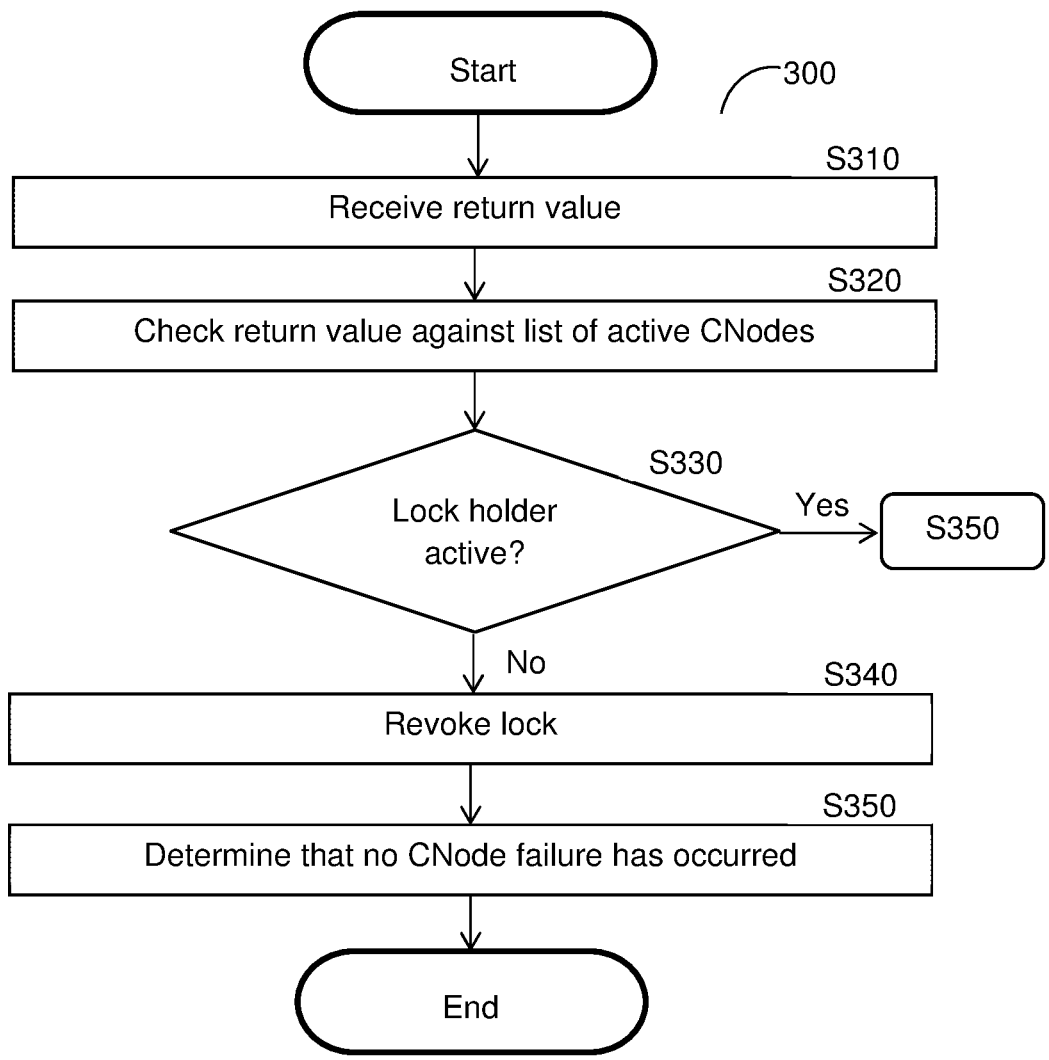
FIG. 3 is a flowchart illustrating a method for handling compute node failures according to an embodiment.

FIG. 3 is a flowchart 300 illustrating a method for handling compute node failures according to an embodiment. In an embodiment, the method is performed by one of the compute nodes (CNodes) 132, FIG. 1.

At S310, a return value indicating a CNode identifier is received. The return value may be received, for example, as part of a failure notification indicating that a lock cannot be taken because a lock is currently in place for a desired range of data.

At S320, the CNode identifier indicated in the return value is checked against a list of active CNodes in the distributed storage system.

In an embodiment, the distributed storage system maintains a list of active CNodes and their current corresponding CNode identifiers. Using such a list allows for checking whether CNodes holding are active without requiring communicating with a CNode for each check. In a further embodiment, a CNode may act as a cluster leader that monitors the state of other CNodes in the cluster and broadcasts the list of active CNodes to the other CNodes in the cluster (e.g., periodically or when a change occurs). Use of a leader CNode to monitor active status of other CNodes prevents redundant monitoring among different CNodes, thereby minimizing communications among CNodes.

At S330, it is determined whether the CNode that is currently holding the lock on the range of data is currently active and, if so, execution continues with S350; otherwise, execution continues with S340.

At S340, when it is determined that the CNode currently holding the lock is not currently active, the lock is revoked. In an embodiment, S340 includes replacing the CNode identifier currently stored in the metadata with a CNode identifier of the CNode performing the method. In a further embodiment, S340 may include performing an atomic compare-and-swap operation (e.g., RDMA compare-and-swap) to replace the identifier. As noted above, the atomicity of the compare-and-swap operation ensures that only one CNode will be able to perform the replacement such that conflicting updates cannot be performed around the same time.

At S350, when it is determined that the CNode holding the lock is currently active, it is determined that no CNode failure has occurred. Execution may wait before reattempting to take the lock.

Figure 4:
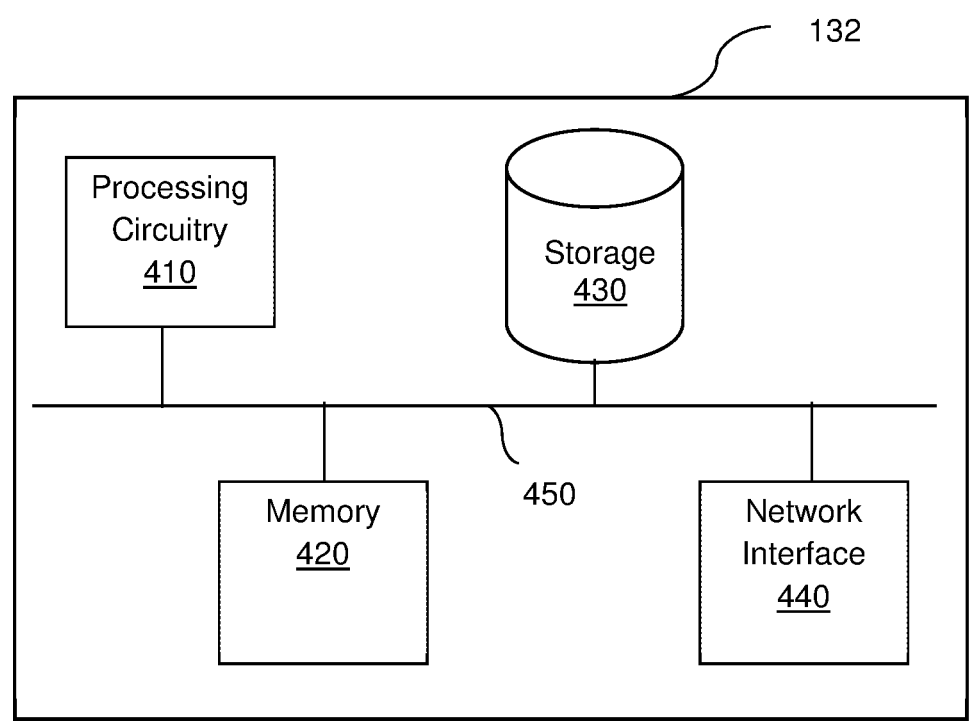
FIG. 4 is a schematic diagram of a compute node according to an embodiment.

FIG. 4 is an example schematic diagram of a compute node 132 according to an embodiment. The compute node 132 includes a processing circuitry 410 coupled to a memory 420, a storage 430, and a network interface 440. In an embodiment, the components of the compute node 132 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the compute node 132 to communicate with the storage nodes 134 for the purpose of, for example, sending access commands, receiving data, and the like. Further, the network interface 440 allows the compute node 132 to communicate with the client nodes 120 for the purpose of receiving data requests, sending data received from the storage nodes 134, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for scalable storage, comprising:
  placing, by a first compute node, a lock on a portion of a storage node, wherein placing the lock further comprises replacing a first value stored in the storage node with a second value using an atomic operation, wherein the atomic operation replaces the first value with the second value when the first value indicates an empty lock status, wherein the second value is a compute node identifier associated with the first compute node, that indicates an active lock status;
  allocating a storage location in the storage node by updating metadata stored in the locked portion of the storage node when the lock has been placed;
  releasing the lock, wherein releasing the lock further comprises replacing the second value with a third value, wherein the third value indicates the empty lock status;
  receiving a failure notification, wherein the failure notification indicates a return value;
  comparing the second value to the return value; and
  determining that the lock was successfully placed when the second value matches the return value.

2. The method of claim 1, wherein the atomic operation is an atomic compare-and-swap operation.

3. The method of claim 1, wherein the lock is a first lock, further comprising:
  performing a failed attempt to place the first lock;
  receiving a failure notification in response to the failed attempt to place the first lock, wherein the failure notification indicates a return value, wherein the return value indicates a compute node identifier; and
  revoking a second lock when the compute node identifier indicated by the return value is not among a list of active compute nodes, wherein the first lock is placed when the second lock has been revoked.

4. The method of claim 3, wherein the list of active compute nodes is maintained by a leader compute node, further comprising:
  receiving the list of active compute nodes from the leader compute node.

5. The method of claim 1, wherein the storage node is a first storage node of a plurality of storage nodes, further comprising:
  mirroring the lock to a second storage node of the plurality of storage nodes; and
  accessing the mirrored lock in the second storage node when the first storage node has failed.

6. The method of claim 5, further comprising:
  mirroring the lock to a third storage node of the plurality of storage nodes when the first storage node has failed.

7. The method of claim 1, wherein the storage location is allocated to a compute node, wherein only the compute node can write to the allocated location.

8. A non-transitory computer readable medium having stored thereon instructions for causing a processing circuitry to execute a process, the process comprising:
  placing, by a first compute node, a lock on a portion of a storage node, wherein placing the lock further comprises replacing a first value stored in the storage node with a second value using an atomic operation, wherein the atomic operation replaces the first value with the second value when the first value indicates an empty lock status, wherein the second value is a compute node identifier associated with the first compute node, that indicates an active lock status;

allocating a storage location in the storage node by updating metadata stored in the locked portion of the storage node when the lock has been placed;

releasing the lock, wherein releasing the lock further comprises replacing the second value with a third value, wherein the third value indicates the empty lock status;

receiving a failure notification, wherein the failure notification indicates a return value;

comparing the second value to the return value; and determining that the lock was successfully placed when the second value matches the return value.

9. A system for scalable storage, comprising:

a first compute node;

a processing circuitry; and a memory, the memory containing instructions that, when executed by the processing circuitry, configure the system to:

place, by the first compute node, a lock on a portion of a storage node, wherein placing the lock further comprises replacing a first value stored in the storage node with a second value using an atomic operation, wherein the atomic operation replaces the first value with the second value when the first value indicates an empty lock status, wherein the second value is a compute node identifier associated with the first compute node, that indicates an active lock status;

allocate a storage location in the storage node by updating metadata stored in the locked portion of the storage node when the lock has been placed;

release the lock, wherein releasing the lock further comprises replacing the second value with a third value, wherein the third value indicates the empty lock status;

receive a failure notification, wherein the failure notification indicates a return value;

compare the second value to the return value; and determine that the lock was successfully placed when the second value matches the return value.

10. The system of claim 9, wherein the atomic operation is an atomic compare-and-swap operation.

11. The system of claim 9, wherein the lock is a first lock, wherein the system is further configured to:

perform a failed attempt to place the first lock;

receive a failure notification in response to the failed attempt to place the first lock, wherein the failure notification indicates a return value, wherein the return value indicates a compute node identifier; and revoke a second lock when the compute node identifier indicated by the return value is not among a list of active compute nodes, wherein the first lock is placed when the second lock has been revoked.

12. The system of claim 11, wherein the list of active compute nodes is maintained by a leader compute node, wherein the system is further configured to:

receive the list of active compute nodes from the leader compute node.

13. The system of claim 9, wherein the storage node is a first storage node of a plurality of storage nodes, wherein the system is further configured to:

mirror the lock to a second storage node of the plurality of storage nodes; and access the mirrored lock in the second storage node when the first storage node has failed.

14. The system of claim 13, wherein the system is further configured to:

mirror the lock to a third storage node of the plurality of storage nodes when the first storage node has failed.

15. The system of claim 9, wherein the storage location is allocated to a compute node, wherein only the compute node can write to the allocated location.

* * * * *